(12) United States Patent
Yellin et al.

(10) Patent No.: US 6,546,042 B1
(45) Date of Patent: *Apr. 8, 2003

(54) CYCLIC ADAPTIVE RECEIVERS FOR DS-CDMA SIGNALS

(75) Inventors: Daniel Yellin, Ra'anana (IL); Shlomo Shamai (Shitz), Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 09/649,590

(22) Filed: Aug. 29, 2000

Related U.S. Application Data (63) Continuation of application No. 09/156,891, filed on Sep. 18, 1998, now Pat. No. 6,208,684.

(51) Int. Cl.[7] .............................................. H04B 1/707
(52) U.S. Cl. ........................ 375/147; 375/149; 375/367
(58) Field of Search ................................ 375/140, 144, 375/148, 347, 367, 145, 149, 147; 370/320, 335, 342, 441

(56) References Cited

U.S. PATENT DOCUMENTS

| | | |
|---|---|---|
| 5,048,052 A | 9/1991 | Hamatsu et al. |
| 5,105,435 A | 4/1992 | Stilwell |
| 5,323,418 A | 6/1994 | Ayerst et al. |
| 5,410,750 A | 4/1995 | Cantwell et al. |
| 5,506,861 A | 4/1996 | Bottomley |
| 5,533,012 A | 7/1996 | Fukasawa et al. |
| 5,572,552 A | 11/1996 | Dent et al. |
| 5,629,929 A | 5/1997 | Blanchard et al. |
| 5,663,956 A | 9/1997 | Schilling |
| 5,796,776 A | 8/1998 | Lomp et al. |
| 5,960,033 A * | 9/1999 | Shibano et al. ............. 327/551 |
| 6,108,317 A * | 8/2000 | Jones et al. ................. 370/320 |
| 6,208,684 B1 * | 3/2001 | Yellin et al. ................. 375/144 |

FOREIGN PATENT DOCUMENTS

| | | |
|---|---|---|
| WO | WO96 14697 | 5/1996 |

OTHER PUBLICATIONS

TIA/EIA/IS–95–A, "Mobile Station–Base Station Compatibility Standard for Dual–Mode Wideband Spread Spectrum Cellular System," Feb. 27, 1996.

(List continued on next page.)

*Primary Examiner*—Don N. Vo
(74) *Attorney, Agent, or Firm*—Eitan, Pearl, Latzer & Cohen-Zedek (57) ABSTRACT

In a receiver receiving a signal, the signal including data which is at least modulated by a cyclic sequence, a method for operating the receiver, the method including the steps of receiving a portion of the signal, the portion being modulated by a predetermined section of the cyclic sequence, receiving an additional portion of the signal, the additional portion being modulated by the predetermined section of the cyclic sequence, jointly processing the portion and the additional portion and producing a set of receiver parameters, the receiver parameters minimizing a predetermined cost function for the predetermined section of the cyclic sequence.

16 Claims, 7 Drawing Sheets

OTHER PUBLICATIONS

A.J. Viterbi, "CDMA Principles of Spread Spectrum Communication", Addison–Wesley Publishing Company, 1995.

Yoshida, "CDMA–AIC highly spectrum Efficient CDMA cellular system based on adaptive interference".

A. Yoon, "A Spread spectrum multi–access system with co–channel interference cancellation", IEEE journal of selected areas in communications, Sep. 1993.

Y. Li, "Serial Interference cancellation method for CDMA" electronics letters, Sep. 1994.

S. Verdu "Multi–user Detection" Cambridge University Press, 1998.

G. Woodward and B. S. Vucetic, "Adaptive Detection for DS–CDMA," Proceedings of the IEEE, vol. 86, No. 7, Jul. 1998.

M. Honig, U. Madhows and S. Verdu, Blind Adaptive Multi–User Detection, IEEE Trans. on Information Theory, Jul. 1995.

S. Verdu, "Adaptive Multi–User Detection", Proc. IEEE Int. Symp. On Spread Spectrum Theory and Applications, (Oulu Finland, Jul. 1994).

S. Haykin, "Adapative Filter Theory", Prentice–Hall, Second Edition, 1991.

J. G. Proakis, Digital Communications Third Edition McGraw Hill Series in Electrical and Computer Engineering 1995.

H.V. Poor and X. Wang, "Code aided interference suppression for DS/CDMA communications: Parallel Blind Adaptive Implementations", IEEE Tran. On Comm, Sep. 1997.

* cited by examiner

CYCLIC ADAPTIVE RECEIVERS FOR DS-CDMA SIGNALS

CROSS-REFERENCE TO RELATED APPLICATIONS

This application is a continuation of U.S. patent application Ser. No. 09/156,891 filed Sep. 18, 1998, now U.S. Pat. No. 6,208,684, which is incorporated herein by reference.

FIELD OF THE INVENTION

The present invention relates to methods and systems for receiving direct-sequence code division multiple access signals, in general and to methods and systems for adaptively receiving such signals, in particular.

BACKGROUND OF THE INVENTION

In recent years, direct-sequence (DS) code division multiple access (CDMA) spread spectrum communication systems and methods experience growing attention worldwide. The IS-95 cellular communication standard is one example for application of DS-CDMA communications, which are described in TIA/EIA/IS-95-A, "Mobile Station-Base Station Compatibility Standard for Dual-Mode Wideband Spread Spectrum Cellular System," Feb. 27, 1996.

Other implementations of CDMA can be found in third generation cellular systems, wireless multimedia systems, personal satellite mobile systems, and more. The basic principle of direct sequence code division multiple access communications, is that each user is assigned with a distinct spreading code, which is often referred to as a pseudo noise (PN) sequence. The spreading code bits (also called chips), are used to modulate the user data. The number of chips used to modulate one data symbol is known as the spreading factor (processing gain) of the system, and it is related to the spreading in bandwidth between the (unmodulated) user data and the CDMA signal.

In its simplest form, the base-band equivalent of the transmitted CDMA signal is, $$T[n] = \sum_{i=1}^{K} a_i[\lfloor n/SF \rfloor] \cdot PN_i[n] \qquad \text{Equation 1}$$

where SF is the spreading factor, $\lfloor n/SF \rfloor$ denotes the integer part of n/SF, $a_i[\lfloor n/SF \rfloor]$ and $PN_i[n]$ are the data symbol and spreading code of the i-th user, respectively, and K is the number of active users. Note that by the definition of $\lfloor n/SF \rfloor$, $a_i[\lfloor n/SF \rfloor]$ is fixed for SF consecutive chips, in accordance with the definition above that each data symbol is modulated by SF chips.

If $T_S$ and $T_C$ denote the symbol and chip intervals in seconds, respectively, then $T_S = SF \cdot T_C$. The chip rate is defined as $1/T_C$, and the symbol rate is defined as $1/T_S$. Accordingly, the chip rate is SF times greater than the symbol rate.

In a DS-CDMA system, all of the users are continuously transmitting over the same frequency band. Thus, at the receiver end, each user is distinguishable from all other users, only through his spreading code. The spreading codes are therefore designed to minimize cross-talk effects between the different users. Conventional systems often use orthogonal spreading sequences.

In practice, however, channel distortions and asynchronicity modify the transmitted signals, and as a consequence, cross-talks between the users exist even when orthogonal spreading codes are utilized by the transmitter.

A plurality of receiver structures are known in the art for DS-CDMA signals, including single-user (SU) and multi-user (MU) receivers, interference cancellation (IC) receivers, and more.

A conventional single-user receiver correlates the received signal with the spreading code of the desired user (user no. 1), as follows $$y_1[m] = \frac{1}{2 \cdot SF} \sum_{n=1}^{SF} R[m \cdot SF + n] \cdot PN_1[m \cdot SF + n]^* \qquad \text{Equation 2}$$

where R[n] denotes the received signal after down conversion and sampling and "*" denotes the complex conjugation. For simplicity we assume QPSK signaling in Equation 2. A simplistic example is provided, by setting K=2 (i.e. a system which includes two users) and discarding channel degradation (i.e. R[n]=T[n]). Hence, the following expression is obtained by substituting Equation 1 into Equation 2, $$y_1[m] = a_1[m] + \text{CrossCorr}_{1,2}[m] \cdot a_2[m] \qquad \text{Equation 3}$$

where $$\text{CrossCorr}_{i,j}[m] = \frac{1}{2 \cdot SF} \cdot \sum_{l=1}^{SF} PN_i[m \cdot SF + l]^* \cdot PN_j[m \cdot SF + l] \qquad \text{Equation 4}$$

The term $\text{CrossCorr}_{1,2}[m] \cdot a_2[m]$ in Equation 3 denotes the interference caused to user 1 by user 2. This, simple example reveals a well known weakness of the SU receiver, namely, its performance are governed by the noise level induced by the cross-talk from all other channel users (see for example, A. J. Viterbi, "*CDMA Principals of Spread Spectrum Communication*", Addison-Wesley Publishing Company, 1995). A more advanced SU receiver includes some means of interference cancellation, which are aimed at reducing these cross-talks, and improving the receiver's performance. For example, see the following references:

Yoshida, "CDMA-AIC highly spectrum Efficient CDMA cellular system based on adaptive interference cancellation", *IEICE transactions on communication* v e79-b n 3 March 1996, p. 353–360, A. Yoon, "A Spread spectrum multi-access system with co-channel interference cancellation", *IEEE journal of selected areas in communications*, September 1993, U.S. Pat. No. 5,105,435 to Stilwell, entitled "Method And Apparatus For Canceling Spread Spectrum Noise", and Y. Li, "Serial interference cancellation method for CDMA" *electronics letters*, September 1994.

Multi-user (MU) receivers, jointly demodulate several or all of the received signals associated with the currently active users. The structure of MU receivers is much more complicated than that of SU receivers, but their performance are significantly better since these receivers are less sensitive to cross-talks between the users. (see for example, S. Verdu "*Multi-user Detection*" Cambridge University Press, 1998, and the references therein).

In practice, the communication link, between the transmitter and the receiver, is often time varying. Therefore, the CDMA receiver, which can be an SU, MU or IC receiver, is required to be adaptive, thereby being capable of tracking the time variations of the communication channel. See for example U.S. Pat. No. 5,572,552 to Dent et. al, entitled "Method and system for demodulation of down-link CDMA signals". See also, G. Woodward and B. S. Vucetic, "Adaptive Detection for DS-CDMA," Proceedings of the IEEE, Vol 86, No. 7, July 1998.

Adaptive algorithms, like those available for DS-CDMA applications, are designed to minimize the expectation of a predetermined cost function (preferably a convex one) with respect to the receiver's parameters. For example, S. Verdu, "Adaptive Multi-User Detection", Proc. IEEE Int. Symp. On Spread Spectrum Theory and Applications, (Oulu Finland, July 1994), is directed to an adaptive least-mean-squares (LMS) MU algorithm which minimizes the mean squared error between the transmitted and reconstructed symbols, i.e.

$$MSE_i \equiv E\{(\hat{a}_i[n] - a_i[n])^2\} \qquad \text{Equation 5}$$

where $\hat{a}_i[n]$ are the MU receiver output samples at the i-th terminal, and $a_i[n]$ are the transmitted symbols of the i-th user. The cost function in Equation 5 requires training sequences. In other words, the receiver must know the exact value of at least some of the transmitted symbols (the $a_i[n]$'s) in order to minimize this cost.

Other methods, which are known in the art, do not require training data. S. Verdu, "Adaptive Multi-User Detection", Proc. IEEE Int. Symp. On Spread Spectrum Theory Applications, (Oulu Finland, July 1994), is also directed to such a method. This method encompasses a decision directed approach, which replaces the unknown $a_i[n]$'s by estimation values thereof.

In the binary case, for example, $a_i[n]$ accepts only two levels: "1" and "−1". Thus, an estimate of which can be obtained from the sign of the corresponding receiver outputs. In this case, the cost in Equation 5 reduces to $$E\{(\hat{a}_i[n] - \text{Sign}\{\hat{a}_i[n]\})^2\} \qquad \text{Equation 6}$$

Another method known in the art, is described in M. Honig, U Madhows and S. Verdu, "Blind Adaptive Multi-User Detection, IEEE Trans. on Information Theory, July 1995. This reference is directed to a method, which is based on the fact that under certain conditions, the cost in Equation 5 is equivalent to the following cost $$OE_i \equiv E\{\hat{a}_i[n]^2\} \qquad \text{Equation 7}$$

in the sense that the minimization of these two different cost functions yields the same receiver.

Since the criterion in Equation 7 does not involve the $a_i[n]$'s, then there is no need for a training sequence. The cost in Equation 7 is known as the minimum output energy (MOE) cost, since the receiver is updated so that the energy at its outputs is minimized. The resulting MOE adaptive algorithms are referred to as "blind" multi-user algorithms, since they operate "blindly" without knowing the transmitted bits.

It is often convenient to express the cost function in terms of sample averaging instead of stochastic expectations. For example, the MSE cost can be defined, at time instant as follows:

$$MSE_i(n) \equiv \sum_{k=1}^{n} (\hat{a}_i[k] - a[k])^2 \lambda^{(n-k)} \qquad \text{Equation 8}$$

where $0 < \lambda \leq 1$ is an exponential forgetting factor giving more weight to recent samples than to previous ones, thus allowing tracking capabilities.

The following references are directed to an adaptive recursive least squares (RLS) type algorithm for the minimization of this criterion:

H. V. Poor and X. Wang, "*Code aided interference suppression for DS/CDMA communications: Interference suppression capability*", *IEEE Tran. On Comm*, September 1997.

H. V. Poor and X Wang, "*Code aided interference suppression for DS/CDMA communications: Parallel Blind Adaptive Implementations*", *IEEE Tran. On Comm*, September 1997.

Similar algorithms can be derived for the cost function in Equation 7, by re-writing it in the following form $$OE_i(n) \equiv \sum_{k=1}^{n} \hat{a}_i[k]^2 \lambda^{(n-k)} \qquad \text{Equation 9}$$

Figure 1A:
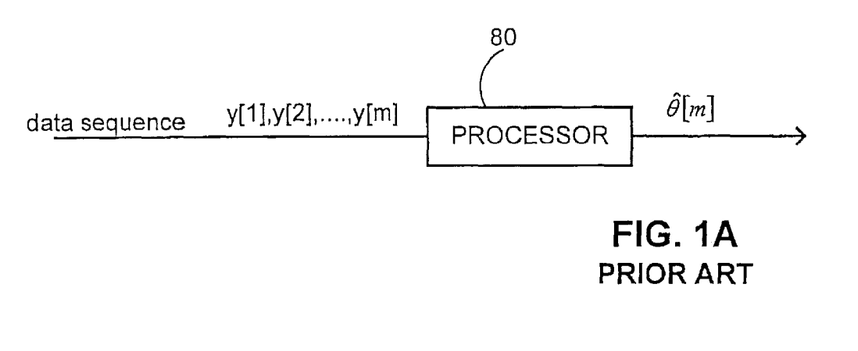
FIG. 1A is a schematic illustration of an adaptive system for receiving a CDMA signal, which is known in the art.

Reference is now made to FIG. 1A, which is a schematic illustration of a system for adaptive detection of a DS-CDMA signal, generally referenced 80, which is known in the art. System 80 is basically a processing unit, which implements any of the above methods. The received samples y[1],y[2], . . . , y[m], are provided as input to the processor. The processor, implementing any of the above methods, calculates the adaptation parameters θ̂[m] for minimizing the cost function which characterizes the receiver 80.

It would be obvious to someone skilled in the art, that the received samples y[1],y[2], . . . , y[m] may also be vector valued, e.g. the outputs from a bank of SU receivers each tuned to a different user.

Figure 1B:
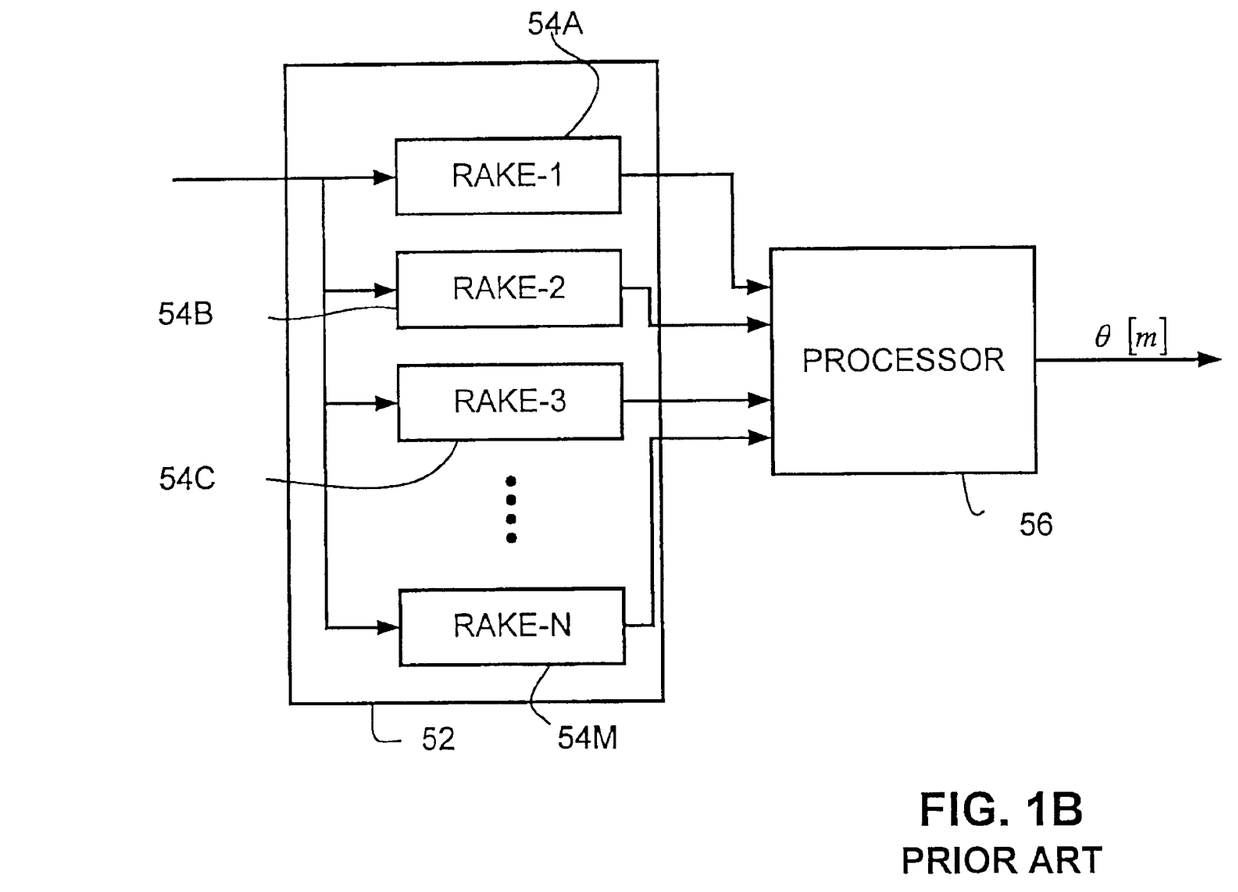
FIG. 1B is a schematic illustration of an adaptive system for receiving a CDMA signal, including a bank of rake receivers, which is known in the art.

Reference is now made to FIG. 1B which is a schematic illustration of a bank of rake receivers, known in the art. It is noted that a rake receiver is a single user (SU) receiver.

Section 50 includes an array of rake receivers 52 and a processor 56, connected thereto. The array 56 includes a plurality of rake receivers 54A, 54B, 54C and 54M, which are set to receive the signals of as much as M users.

The input samples to the processor (56) are vector valued in this case, so that each sample Y[i] is given by $$Y[i] = \begin{bmatrix} Y[i]_1 \\ Y[i]_2 \\ \vdots \\ Y[i]_M \end{bmatrix}$$

where $Y[i]_k$ is the i-th sample of the k-th rake receiver.

The embodiment in FIG. 1B is often utilized in adaptive MU receivers where the processor 56 can detect the transmitted information of user 1 by processing the samples provider by rake receiver 54A, while taking into consideration the influence of the respective samples of the second user, as provided by the second rake receiver (54B), the respective samples of the third user, as provided by the third rake receiver (54C) and so forth.

Adaptive algorithms are often conveniently described in terms of their bandwidth. An adaptive algorithm is considered to have an overall response of a low-pass filter due to the inherent averaging operation that is either implicitly or explicitly dominant in any adaptive scheme. The bandwidth of this equivalent low-pass response is considerably lower than that of the data, and it governs the tracking and noise rejection capabilities of the adaptive algorithm. A large bandwidth implies fast tracking but relatively high residual noise (i.e. large error variance of θ̂[m]), whereas low bandwidth implies good noise rejection but poor tracking capabilities.

In many DS-CDMA systems, the spreading code is much longer than the symbol period (the down-link of IS-95 systems, for example). Adaptive algorithms, like the ones reported in the above references, whose bandwidth is lower than the symbol rate, are inappropriate for such systems. This is due to the fact that these algorithms are unable to track the fast varying interference between the users (whose bandwidth is proportional to the symbol rate since a new interference value is produced with each new data symbol). The reason for the fast varying nature of the interference lies in the fact that when the PN sequence spans more than one data symbol, different portions of which are utilized in Equation 4 with different data symbols. Thus, the cross-correlation accepts a different value with each new data symbol.

In some cases, this situation is unavoidable, (e.g. when random spreading codes are utilized). However, in most cases of practical interest, the spreading codes are non-random and finite.

SUMMARY OF THE PRESENT INVENTION

It is an object of the present invention to provide a novel method for receiving a DS-CDMA signal, which overcomes the disadvantages of the prior art.

It is another object of the present invention to provide a novel DS-CDMA receiver, which overcomes the disadvantages of the prior art.

In accordance with the present invention there is provided a method for receiving DS-CDMA signal. The method is for implementing in a receiver receiving a signal, where the signal includes data which is at least modulated by one cyclic sequence. The method includes the steps of:

receiving a portion of the signal, where the portion is modulated by a predetermined section of the cyclic sequence, receiving an additional portion of the signal, where the additional portion is modulated by the same predetermined section of the cyclic sequence, jointly processing the portion and the additional portion, and producing a set of receiver parameters, which minimize a predetermined cost function for the predetermined section of the cyclic sequence.

The method of the invention can also include the step of predetermining sections within the cyclic sequence. It is noted that these sections can include one or more elements of the cyclic sequence.

According to another aspect of the invention, the received signal is demodulated by the cyclic sequence, thereby extracting the data symbols which are contained therein. Then, the above operations are performed for the symbols, with respect to the predetermined sections of the cyclic sequence, where preferably, the length of these sections is in the order of a symbol.

Accordingly, the method of the present invention with respect to this aspect, includes the steps of:

demodulating the signal, by the cyclic sequence, thereby producing a plurality of received samples, determining a plurality of sections, each the section having a length of at least one sample, each the section being demodulated by a predetermined portion of the cyclic sequence, detecting portions of the demodulated signal, which are associated with each of the sections, jointly processing the detected portions, which are associated by a selected one of the sections, and producing a set of receiver parameters for each the sections, the receiver parameters minimizing a predetermined cost function for the selected section.

It is noted that the received signal can be a signal is a DS-CDMA signal or any other spread signal which is modulated by a cyclic sequence.

The demodulating and extracting of the data symbols can include rake demodulating the DS-CDMA signal, using a rake receiver.

In accordance with another aspect of the invention, there is thus provided a receiver for detecting a signal, where the signal includes data which is at least modulated by a cyclic sequence. The receiver includes a plurality of processing units, each the processing units being associated with a predetermined section of the cyclic sequence, and a distributing unit, connected to each the processing units.

The distributing unit receives the signal, detects portions of the signal, each the portions being associated with one of the predetermined sections. The distributing unit provides selected ones of the portions to a selected one of the processing units, wherein both the selected portions and the selected processing unit are associated with the same predetermined section. Each of the processing units processes the selected portions, thereby producing set of receiver parameters which minimize a predetermined cost function for that specific section.

In accordance with a further aspect of the invention there is thus provided a receiver for detecting a signal. The signal includes data which is at least modulated by a cyclic sequence. The receiver includes a despreading unit, for demodulating the signal by the cyclic sequence, thereby producing a demodulated signal, a plurality of processing units, each the processing units being associated with a predetermined section of the cyclic sequence, and a distributing unit, connected between the despreading unit and each of the processing units.

Accordingly, this receiver demodulates the received signal according to the cyclic sequence and operates on the demodulated symbols, with respect to their location, as they were modulated, within the cyclic sequence. It is noted that the despreading unit can includes a rake receiver.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art, by providing a novel method which utilizes the cyclic nature of the cross-talk in DS-CDMA systems, in which the span of the PN sequence is greater than one symbol.

According to the present invention, the cyclic spreading sequence is broken into a plurality of sections, each including segments at pre-specified locations. Each of these sections is assigned with a different cost function and a respective set of receiver parameters, which are used to minimize that cost function. During receptions, portions of the received signal, respective of a section, are jointly processed, so as to dynamically update the respective set of receiver parameters.

Figure 2:
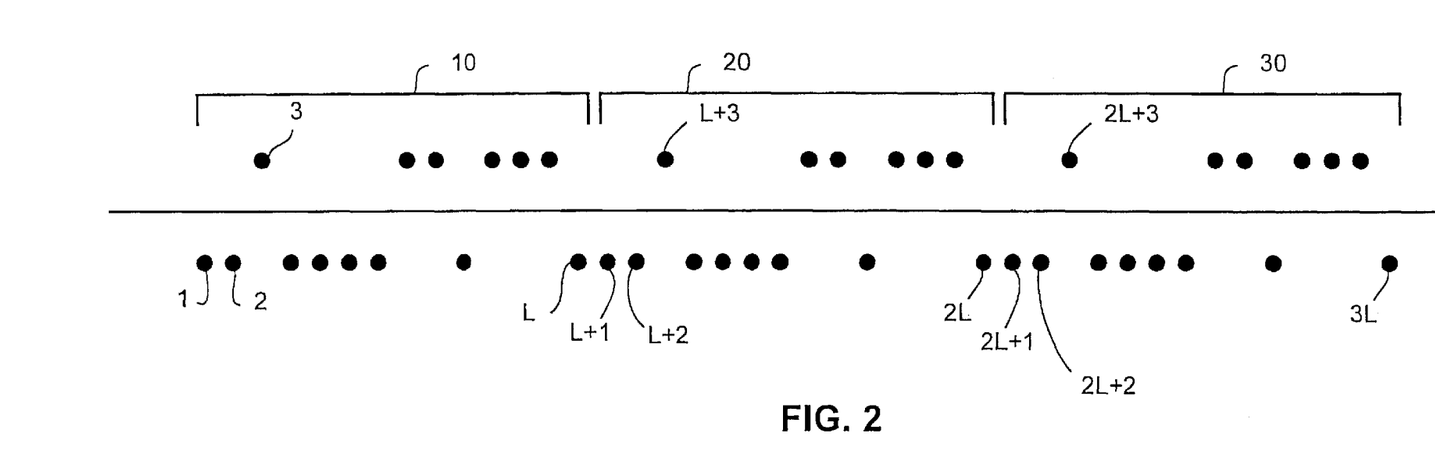
FIG. 2 is an illustration of a cyclic PN spreading signal, used in conventional DS-CDMA systems.

Reference is now made to FIG. 2, which is an illustration of a cyclic PN signal of period L.

The signal is basically constructed of a repetitive predetermined sequence of samples, wherein sequence 10 is the initial sequence, sequence 20 is a first repetition of the sequence and sequence 30 is a second repetition of the sequence.

Sequence 10 includes L samples designated 1, 2, 3 . . . L. Sequence 20 includes L samples designated L+1, L+2, L+3 . . . 2L. Sequence 30 includes L samples designated 2L+1, 2L+2, 2L+3 . . . 3L.

Since all three sequences are identical, then, sample 1 is identical to sample L+1 as well as to sample 2L+1. In general, a sample i in the initial sequence is identical to a respective sample i+kL, wherein k is the serial number of the repetitive sequence and L is the length of the cyclic PN sequence.

For example, a conventional receiver attempts to minimize a predetermined cost function, by dynamically adapting a pre-specified set of receiver parameters. These parameters are continuously calculated from the received samples, sample by sample. Accordingly, and with reference to FIGS. 1 and 2, sample 2 is jointly processed with sample 1, sample 3 is jointly processed with samples 2 and 1, sample L+2 is jointly processed with all of the preceding L+1 samples, which include samples 1, 2, 3, . . . L and L+1.

A receiver according to the present invention, attempts to minimize a plurality of cost functions, each for a predetermined section of the cyclic PN spreading sequence. Accordingly, the receiver dynamically adapts pre-specified-sets of receiver parameters, a set per cost function. The parameters of each set are calculated from portions of the received signal which are modulated by a selected section of the cyclic spreading sequence.

According to the method of the present invention, the received samples are analyzed according to their location within the repetitive PN sequence. A sample, in a selected location within the cyclic sequence, is jointly processed with respective preceding samples, located in the same location within the cyclic sequence, thereby producing a set of parameter values for that location.

Accordingly, sample 2L+1 is jointly processed with samples L+1 and 1, thereby yielding a first set of parameter values for the first location in the cyclic sequence. Sample 2L+2 is jointly processed with samples L+2 and 2, thereby yielding a second set of parameter values for the second location in the cyclic sequence. Sample 3L is jointly processed with samples 2L and L, thereby yielding the last set of parameter values for the last location in the cyclic sequence. This aspect of the present invention is described in detail herein below, in conjunction with FIG. 6.

Figure 6:
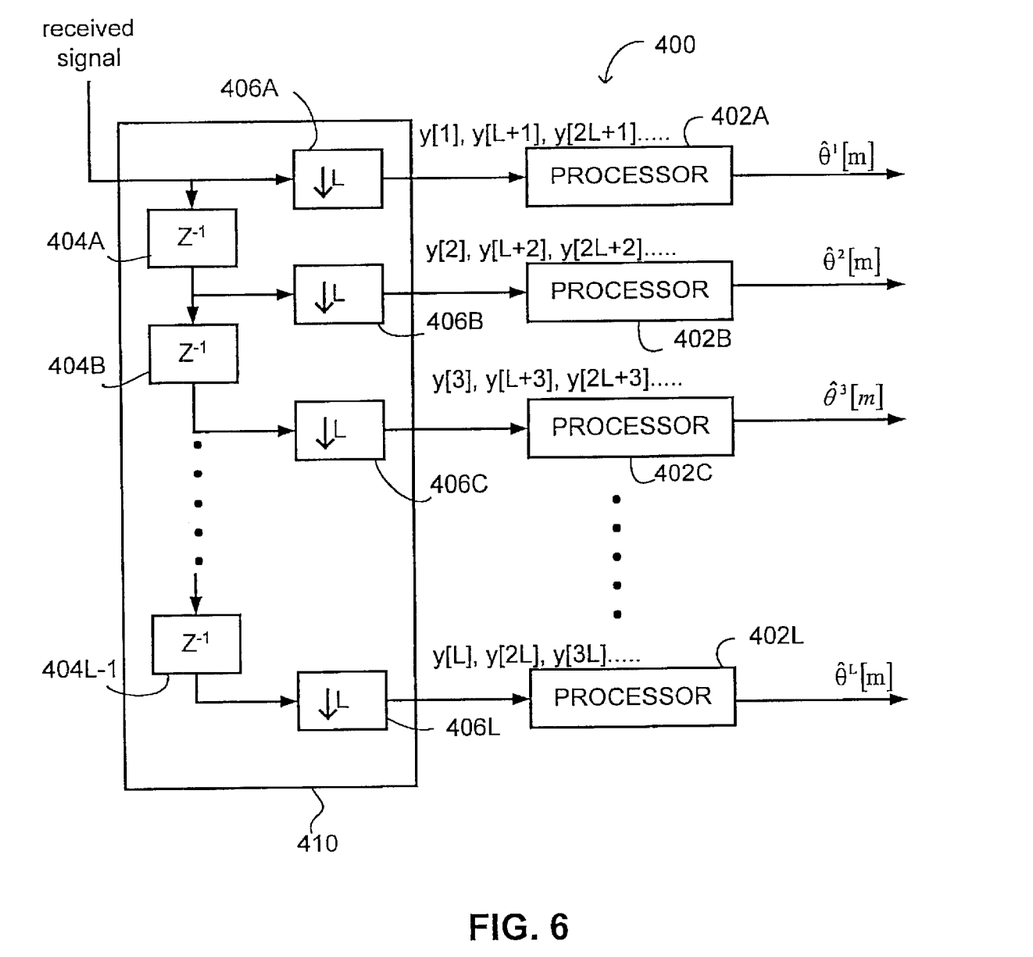
FIG. 6 is a schematic illustration of a receiver, generally referenced 400, constructed and operative in accordance with another preferred embodiment of the present invention.

Reference is now made to FIG. 6, which is a schematic illustration of a receiver, generally referenced 400, constructed and operative in accordance with a preferred embodiment of the present invention.

Receiver 400 includes a plurality of processors 402A, 402B, 402C and 402L, and a sample distributing system 410 which includes a plurality of down-samplers 406A, 406B, 406C and 406L and a plurality of sample delay units 404A, 404B, 404C and 404L−1.

The receiver is constructed to have a plurality of branches, wherein each branch includes a down-sampler 406($i$) and a respective processor 402($i$), connected thereto. Accordingly, the first branch includes down-sampler 406A and processor 402A. The inputs of each adjacent branches are connected there between via the plurality of delay units 404.

The input of the first branch is connected directly to the source of the stream of the received samples, which are sampled at the chip rate. The input of the second branch (B) is connected to the input of the first branch (A), via a sample delay unit 404A. The input of the third (C) branch is connected to the input of the second branch (B), via a sample delay unit 404B. The input of the last branch (L) is connected to the input of the previous branch (L−1, not shown), via a sample delay unit 404L.

Each of the sample delay units 404A, 404B, 404C and 404L−1 delays the received stream of samples, by one sample time period, before it provides the stream to the next branch of the receiver 402. Accordingly, the branch, which includes down-sampler 406A and processor 402A, receives the signal as it arrives into the receiver, the branch, which includes down-sampler 406A and processor 402A, receives the signal, delayed by one sample time period.

Each of the down-samplers, selects consecutive samples, which are located at a predetermined sample distance there between. In the present example, all of the down-samples are programmed to provide consecutive samples, which are L samples apart. Accordingly, down sampler 406A selects samples 1, L+1, 2L+1 and any other sample which is located at kL+1, where k is any integer and L is the length of the PN sequence. Accordingly, the processor 402A receives these samples, jointly processes them and adaptively provides a set of parameters for minimizing the cost function for this location within the cyclic cross-correlation sequence.

Since the stream of samples which is provided to the second branch is delayed by one sample, then the down sampler 406B selects samples 2,L+2, 2L+2, 3L+2 and any other sample which is located at 2+kL. Accordingly, the processor 402B receives these samples, jointly processes them and adaptively provides a set of parameters for minimizing the cost function for this location within the cyclic cross-correlation sequence.

It is noted that receiver 400 is adapted to include a branch for each sample within a cyclic cross-correlation sequence which includes L samples.

Each of the processors 402A, 402B, 402C and 402L receives a selected sample, every L samples, and processes all of the samples it received thereby producing a set of parameters for adapting a cost function, which is associated therewith.

According to another aspect of the present invention, samples, which are modulated by PN elements, which are located in selected locations within the cyclic sequence, are grouped together for joint analysis. For example, samples in the first location, the third location and the last location in the cyclic sequence are grouped together. Hence, with reference to FIG. 2, samples 2L+1, 2L+3 and 3L are jointly processed with samples L+1, L+3, 2L, 1, 3 and L, thereby yielding a set of parameter values corresponding to these selected locations.

Samples, which are located in other locations within the cyclic sequence, can also be grouped, jointly processed, thereby yielding more sets of parameter values.

Figure 3:
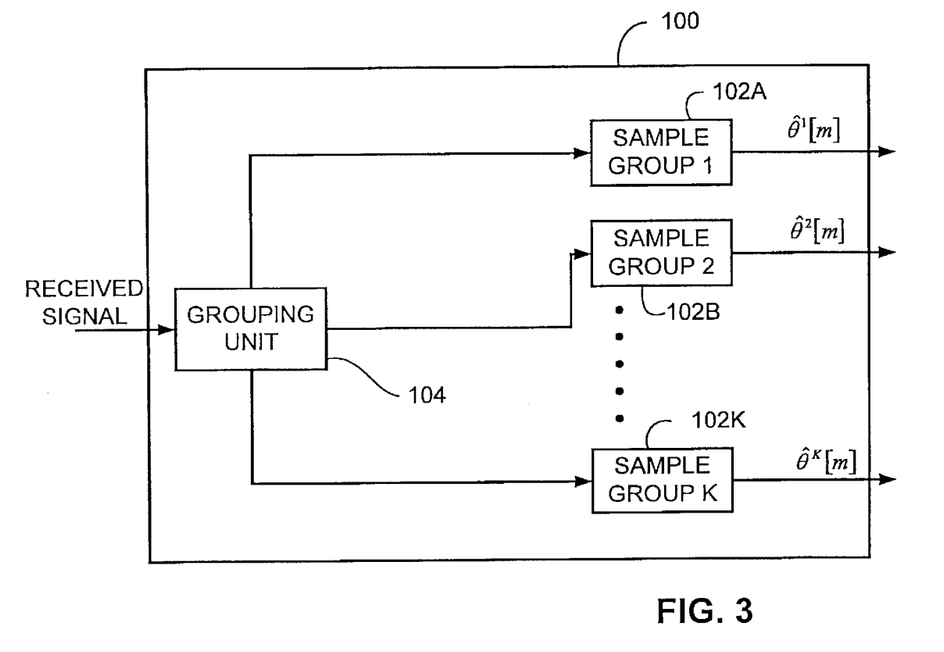
FIG. 3 is a schematic illustration of a receiver, generally referenced 100, constructed and operative in accordance with a preferred embodiment of the present invention.

Reference is now made to FIG. 3, which is a schematic illustration of a receiver, generally referenced 100, constructed and operative in accordance with preferred embodiment of the present invention.

Receiver 100 includes a plurality of adaptive parameter-set estimation units 102A, 102B–102K and a distributing unit 104, connected at the input of each of the adaptive parameter-set estimation units 102.

Each of the adaptive parameter-set estimation units 102, is adapted to process a portion of the received signal, and calculated therefrom a set of receiver parameters which minimize a pre specified cost function. The portion of the received signal includes a group of samples, which are modulated by elements of the cyclic PN sequence, and located at predetermined locations, within the cyclic PN sequence.

Adaptive parameter-set estimation unit 102A estimates the parameter set, for the first cost function, according to the first group of samples. With respect to the above example, this group includes samples in the first location, the third location and the last location in the cyclic sequence. Hence, with reference to FIG. 2, adaptive parameter-set estimation unit 102A jointly processes samples 2L+1, 2L+3 and 3L with samples L+1, L+3, 2L, 1, 3 and L, thereby yielding the first set of parameter values, corresponding to these selected locations.

Similarly, adaptive parameter-set estimation unit 102B estimates the second adaptive parameter-set, for the second cost function, according to the second group of sample.

Finally, adaptive parameter-set estimation unit 102K estimates the Kth adaptive parameter-set, for the Kth cost function, according to the Kth group of samples.

The distributing unit 104 distributes the samples, to each of the adaptive parameter-set estimation units 102, according to their respective groups.

Figure 5:
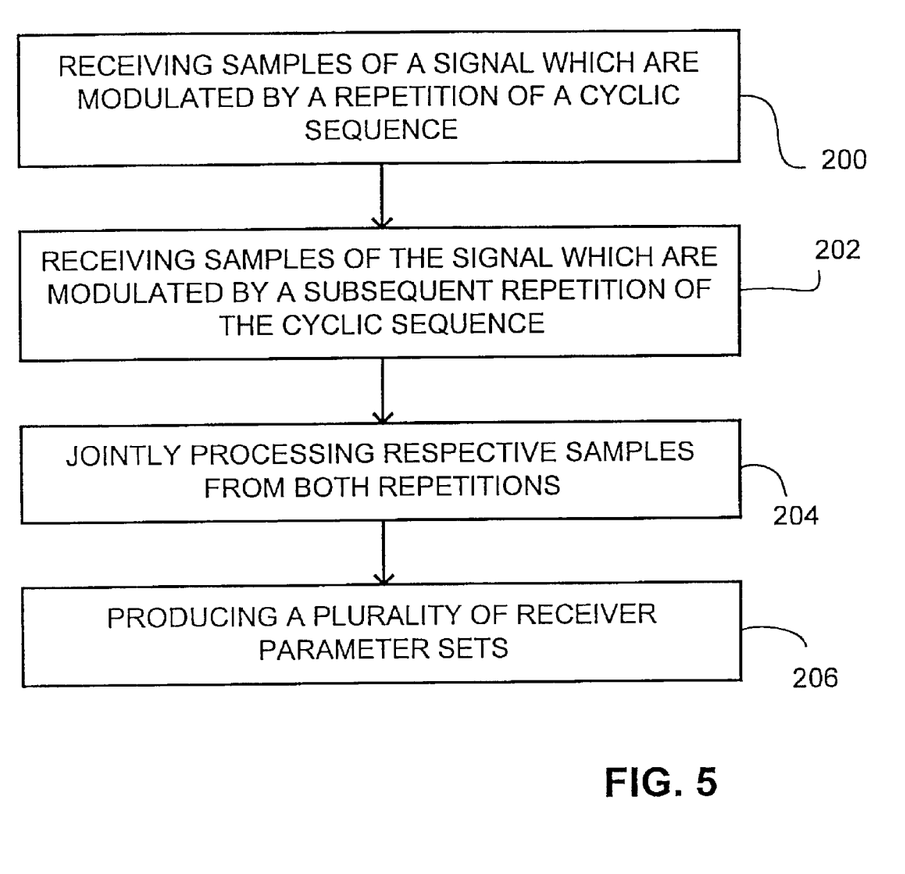
FIG. 5 is a schematic illustration of a method for operating the receiver of FIG. 3, operative in accordance with a preferred embodiment of the present invention.

Reference is now made to FIG. 5, which is a schematic illustration of a method for operating each adaptive parameter set estimation unit of the receiver 100 of FIG. 3, operative in accordance with preferred embodiment of the present invention. The present example provides a demonstration for adaptive parameter set estimating unit 102A, which is programmed to process the first group of samples.

In step 200, the adaptive parameter set estimating unit 102A, receives samples of a signal which are modulated by a repetition of a cyclic spreading PN sequence. With reference to FIGS. 2 and 3, adaptive parameter set estimating unit 102A receives the first group of samples.

In step 202, the adaptive parameter set estimation unit 102A receives samples of the signal which are modulated by a later repetition of a cyclic sequence. With reference to FIGS. 1 and 2, adaptive parameter set estimating unit 102A receives the first group of samples, of sequence 20.

In step 204, the adaptive parameter set estimation unit 102A jointly processes the first group of samples of sequence 10 with the first group of samples of sequence 20, thereby producing an adaptive receiver parameter set for minimizing the cost function which is associated with that first group (step 206).

It is noted that the method of the present invention is applied for all of the adaptive parameter set estimation units 102A and 102B–102K, of the receiver 100. Each of these units is pre-programmed to address samples which are positioned at pre-selected locations within the cyclic spreading sequence. It is noted that each of the groups can include a single sample.

It will be appreciated that the PN sequence of the communication standard IS-95, also known as the down-link short-code, includes 32,768 chips. Accordingly, a receiver according to the invention can be adapted to minimize a different cost function for every chip within the cyclic sequence, or for any group of chips thereof, for example, a group for every symbol.

According to another aspect of the invention, all processing is performed in symbol level. The cyclic nature of the PN sequence causes the symbol level cross-talk between the users to be cyclic. Since the PN sequences are periodical, i.e. $PN_i[n]=PN_i[n+k \cdot L]$ for any value of k (and similarly $PN_j[n]=PN_j[n+k \cdot L]$), then, we immediately obtain from Equation 4 that for all k $$CrossCorr_{i,j}[m] = CrossCorr_{i,j}\left[m+k \cdot \frac{L}{SF}\right]$$  Equation 10
$$= CrossCorr_{i,j}[m+k \cdot N]$$

Wherein i and j denote a first user and a second user, respectively, m denotes a symbol time index, k denotes an arbitrary integer and N=L/SF.

As can be seen from Equation 10, the cross correlation sequence is cyclic with a period N equal to L/SF symbols. Therefore, the cross-talk term in Equation 3 is also cyclic with a period of N symbols.

As an example, in the down-link direction of IS-95 systems, L=32768 and SF=64. Thus, according to Equation 10, the cross correlation sequence is cyclic with period N=512 symbols.

The method of the present invention can be implemented for any known cost function, denoted Cost, as follows. A family of cost functions $$Cost[l] 0 \leq l \leq N-1$$  Equation 11 is defined for each of the N different values of the cyclic cross-correlation sequence. Accordingly, the present invention partitions the data vector, $$y^l[m]=y[l+m \cdot N]$$  Equation 12 where y[m] denotes the data samples (which may also be vector valued) and $y^l[n]$ is the data sequence used to minimize the l'th cost function. Then, a set of N parallel adaptive algorithms are derived such that the l'th algorithm utilizes the l'th data sequence to produce the l'th parameter set $\hat{\theta}^l[m]$ that minimizes the l'th cost function.

The cost functions used in Equation 11 can correspond to the MSE cost of Equation 5, its decision directed version presented in Equation 6, the MOE cost of Equation 7, the RLS versions of the MSE and MOE costs of Equation 8 and Equation 9, respectively, or to some other cost function. In either case, we obtain a generalization of existing adaptive algorithms to the more general situation of a family of cost functions. Note that existing approaches fall as special cases of the above method when N is set to 1.

Figure 7:
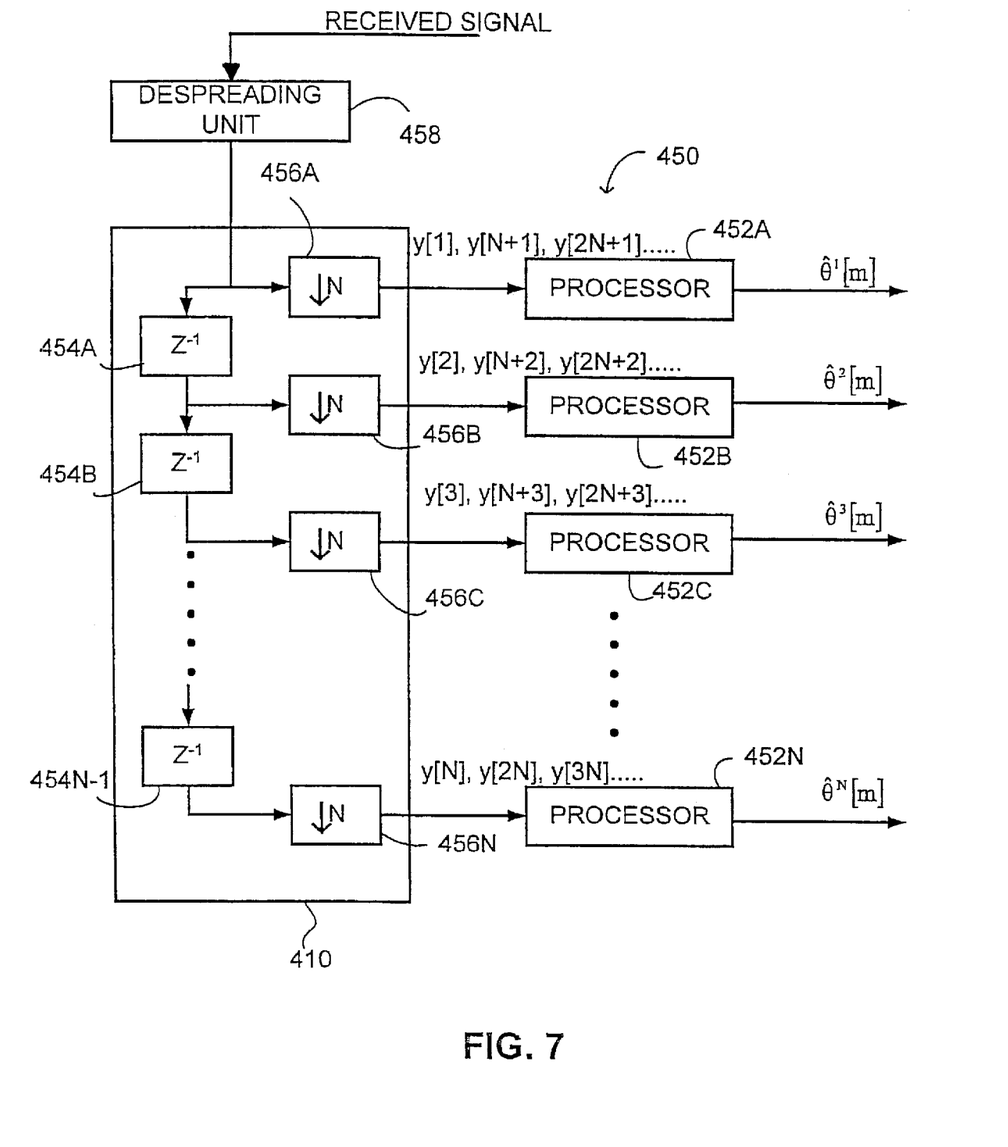
FIG. 7 is a schematic illustration of a receiver, generally referenced 400, constructed and operative in accordance with a further preferred embodiment of the present invention.

Reference is now made to FIG. 7, which is a schematic illustration of a receiver, generally referenced 450, constructed and operative in accordance with a preferred embodiment of the present invention.

Receiver 450 includes a plurality of processors 452A, 452B, 452C and 452N, a despreading unit 458 and a symbol distributing system 410 which includes a plurality of down-samplers 456A, 456B, 456C and 456N and a plurality of sample delay units 454A, 454B, 454C and 454N.

The receiver is constructed to have a plurality of branches, wherein each branch includes a down-sampler 456(i) and a respective processor 452(i), connected thereto. Accordingly, the first branch includes down-sampler 456A and processor 452A. The inputs of each adjacent branches are connected there between via the plurality of delay units 454.

The input of the first branch is connected directly to the source of the stream of the received symbols, which are sampled at the symbol rate. This is a despreader (reference 458) or a rake receiver, which are known in the art. The input of the second branch (B) is connected to the input of the first branch (A), via a sample delay unit 454A. The input of the third (C) branch is connected to the input of the second branch (B), via a sample delay unit 454B. The input of the last branch (N) is connected to the input of the previous branch (N−1, not shown), via a sample delay unit 454N−1.

It should be clear to someone skilled in the art, that the despreading unit (458) can be composed of several conventional despreaders, each tuned to a specific user. In this case, the outputs of the despreading unit (458) are vector valued.

Each of the sample delay units 454A, 454B, 454C and 454N−1 delays the received stream of symbols, by one symbol time period, before it provides the stream to the next branch of the receiver 452. Accordingly, the branch, which includes down-sampler 456A and processor 452A, receives the signal as it arrives into the receiver, the branch, which includes down-sampler 456A and processor 452A, receives the signal, delayed by one symbol time period.

Each of the down-samplers, selects consecutive symbols, which are located at a predetermined symbol distance there between. In the present example, all of the down-samples are programmed to provide consecutive symbols, which are N symbols apart. Accordingly, down sampler 456A selects symbols 1, N+1, 2N+1 and any other sample which is located at kN+1, where k is any integer and N is the length of the cross-correlation sequence. Accordingly, the processor 452A receives these symbols, jointly processes them and adaptively provides a set of parameters for minimizing the cost function for this location within the cyclic cross-correlation sequence.

Since the stream of symbols which is provided to the second branch is delayed by one symbol, then the down sampler 456B selects symbols 2,N+2, 2N+2, 3N+2 and any other symbol which is located at 2+kN. Accordingly, the processor 452B receives these symbols, jointly processes them and adaptively provides a set of parameters for minimizing the cost function for this location within the cyclic cross-correlation sequence.

It is noted that receiver 450 is adapted to include a branch for each symbol within a cyclic cross-correlation sequence which includes N symbols.

Each of the processors 452A, 452B, 452C and 452N receives a selected symbol, every N symbols, and processes all of the symbols it received thereby producing a set of parameters for adapting a cost function, which is associated therewith.

As one example, consider the MSE cost of Equation 5 with the simple setting of a two-user system. Let the receiver be composed of two PN correlators matched to the PN sequences of the two active users, followed by an adaptive processor for jointly combining them. The outputs of the two PN correlators are (see Equation 3) given by $$x_1[m]=a_1[m]+CrossCorr_{1,2}[m]\cdot a_2[m] \qquad \text{Equation 13}$$

and similarly, $$x_2[m]=a_2[m]+CrossCorr_{2,1}[m]\cdot a_1[m] \qquad \text{Equation 14}$$

We want to adaptively estimate the parameter vector $$\hat{\theta} = \begin{bmatrix} \alpha \\ \beta \end{bmatrix}$$

so that the signal $$\hat{a}_1[m]=\alpha\cdot x_1[m]+\beta\cdot x_2[m] \qquad \text{Equation 15}$$

minimizes $MSE_1$ as given in Equation 5.

Define the data vector $$Y[m] = \begin{bmatrix} \hat{a}_1[m] \\ a_1[m] \\ x_1[m] \\ x_2[m] \end{bmatrix} \qquad \text{Equation 16}$$

and partition it according to Equation 12, as follows $$Y^l[m] \equiv Y[l+m\cdot N] = \begin{bmatrix} \hat{a}_1[l+m\cdot N] \\ a_1[l+m\cdot N] \\ x_1[l+m\cdot N] \\ x_2[l+m\cdot N] \end{bmatrix} \equiv \begin{bmatrix} \hat{a}'_1[m] \\ a'_1[m] \\ x'_1[m] \\ x'_2[m] \end{bmatrix} \qquad \text{Equation 17}$$

According to Equation 11, the l-th data vector—$Y^l[m]$ is used to update the l-th parameter set—$\hat{\theta}^l$ in order to minimize the l-th cost function $$MSE_1[l]=E\{(\hat{a}'_1[m]-a'_1[m])^2\}=E\{(\hat{a}_1[l+m\cdot N]- a_1[l+m\cdot N])^2\} \qquad \text{Equation 18}$$

In particular, we write explicitly from Equation 15 that $\hat{a}'_1[m]$ is given by $$\hat{a}'_1[m] = \alpha' \cdot x'_1[m] + \beta' \cdot x'_2[m] \qquad \text{Equation 19}$$
$$= \alpha' \cdot x_1[l+m\cdot N] + \beta' \cdot x_2[l+m\cdot N]$$

The conventional LMS type adaptive algorithm for the minimization of $MSE_1[l]$ given the data vector $Y^l[m]$ is the following $$\hat{\theta}'[m] = \hat{\theta}'[m-1] - \mu_m \cdot (\hat{a}'_1[m] - a'_1[m]) \cdot \begin{bmatrix} x'_1[m] \\ x'_2[m] \end{bmatrix} \qquad \text{Equation 20}$$

$$= \hat{\theta}'[m-1] - \mu_m \cdot (\hat{a}_1[l+m\cdot N] -$$

$$a_1[l+m\cdot N]) \cdot \begin{bmatrix} x_1[l+m\cdot N] \\ x_2[l+m\cdot N] \end{bmatrix};$$

$$0 \le l \le N-1$$

where $\mu_m$ is the sequence of step-sizes of the algorithm that are often set to a constant, i.e. $\mu_m \equiv \mu$.

Following the derivation in e.g. S. Haykin, "Adapative Filter Theory", Prentice-Hall, Second Edition, 1991, it can be shown, that as m approaches infinity $\hat{\theta}'[m]$ converges to $$\overline{\theta}' = \begin{bmatrix} \overline{\alpha}' \\ \overline{\beta}' \end{bmatrix} = \begin{bmatrix} \dfrac{1}{1 - CrossCorr_{1,2}[l] \cdot CrossCorr_{2,1}[l]} \\ \dfrac{-CrossCorr_{1,2}[l]}{1 - CrossCorr_{1,2}[l] \cdot CrossCorr_{2,1}[l]} \end{bmatrix} \quad \text{Equation 21}$$

Substituting Equation 13, Equation 14 and Equation 21 into Equation 19, we immediately obtain the desired result $$\hat{a}'_1[m] = a'_1[m] \forall l \rightarrow \hat{a}_1[m] = a_1[m] \quad \text{Equation 22}$$

that indeed minimizes (zeros) all l cost functions of Equation 18.

With reference to FIG. 7, the element 458 performs the despreading operation associated with Equation 13 and Equation 14, the element 410 performs the data partitioning of Equation 17, whereas each processor (elements 452) performs the adaptation of Equation 20.

As another example, consider binary signaling and the decision directed cost of Equation 6. Here, the transmitted symbols are not assumed to be known, and therefore we exclude $a_1[m]$ from the data vector. Thus, we now define the data vector $$Y[m] = \begin{bmatrix} \hat{a}_1[m] \\ x_1[m] \\ x_2[m] \end{bmatrix} \quad \text{Equation 23}$$

and partition it according to Equation 12

$$Y'[m] \equiv Y[l + m \cdot N] = \begin{bmatrix} \hat{a}_1[l + m \cdot N] \\ x_1[l + m \cdot N] \\ x_2[l + m \cdot N] \end{bmatrix} \equiv \begin{bmatrix} \hat{a}'_1[m] \\ x'_1[m] \\ x'_2[m] \end{bmatrix} \quad \text{Equation 24}$$

The resulting set of LMS type adaptive algorithms are $$\hat{\theta}'[m] = \hat{\theta}'[m-1] - \mu_m \cdot (\hat{a}'_1[m] - \text{Sign}\{\hat{a}'_1[m]\}) \cdot \begin{bmatrix} x'_1[m] \\ x'_2[m] \end{bmatrix} \quad \text{Equation 25}$$

$$= \hat{\theta}'[m-1] - \mu_m \cdot (\hat{a}_1[l+m\cdot N] - \text{Sign}\{\hat{a}_1[l+m\cdot N]\}) \cdot \begin{bmatrix} x_1[l+m\cdot N] \\ x_2[l+m\cdot N] \end{bmatrix}$$

which are very similar to the adaptive algorithms of Equation 20 only that the unavailable sequence $a'_1[m]$ is replaced by its estimate $\text{Sign}\{\hat{a}'_1[m]\}$.

As another example, consider the MSE cost of Equation 8 that leads to an RLS adaptive algorithm. Using the data vector in Equation 23 and its partition in Equation 24, and applying the conventional derivation of the RLS algorithm (see e.g. S. Haykin, "Adaptive Filter Theory", Prentice-Hall, Second Edition, 1991), we obtain $$\hat{\theta}'[m] = \hat{\theta}'[m-1] - (\hat{a}'_1[m] - a'_1[m]) \cdot K'[m] \quad \text{Equation 26}$$

$$= \hat{\theta}'[m-1] - (\hat{a}_1[l+m\cdot N] - a'_1[m]) \cdot K'[m];$$

$$0 \leq l \leq N - 1$$

where $$K'[m] = \dfrac{1}{\lambda + [x'_1[m]\, x'_2[m]] \cdot P'[m-1] \cdot \begin{bmatrix} x'_1[m] \\ x'_2[m] \end{bmatrix}} \cdot P'[m-1] \cdot \begin{bmatrix} x'_1[m] \\ x'_2[m] \end{bmatrix} \quad \text{Equation 27}$$

and and $$P'[m] = \tfrac{1}{\lambda} \cdot [P'[m-1] - K'[m] \cdot [x'_1[m]\, x'_2[m]] \cdot P'[m-1]] \quad \text{Equation 28}$$

Similar derivations can be performed to the MOE cost of Equation 7 or Equation 9, or any other cost function.

It is hereby noted that when substituting, in either of the algorithms in Equation 20, Equation 25 or Equation 26, N=1, one obtains a single adaptive algorithm as in prior art. Since a single-adaptive algorithm will, at most, converge to a single parameter value $\overline{\theta}$, it is clear that Equation 21 cannot be satisfied for all values of l. Therefore, Equation 22 shall not be satisfied. Hence, complete recovery of input is impossible.

Figure 4:
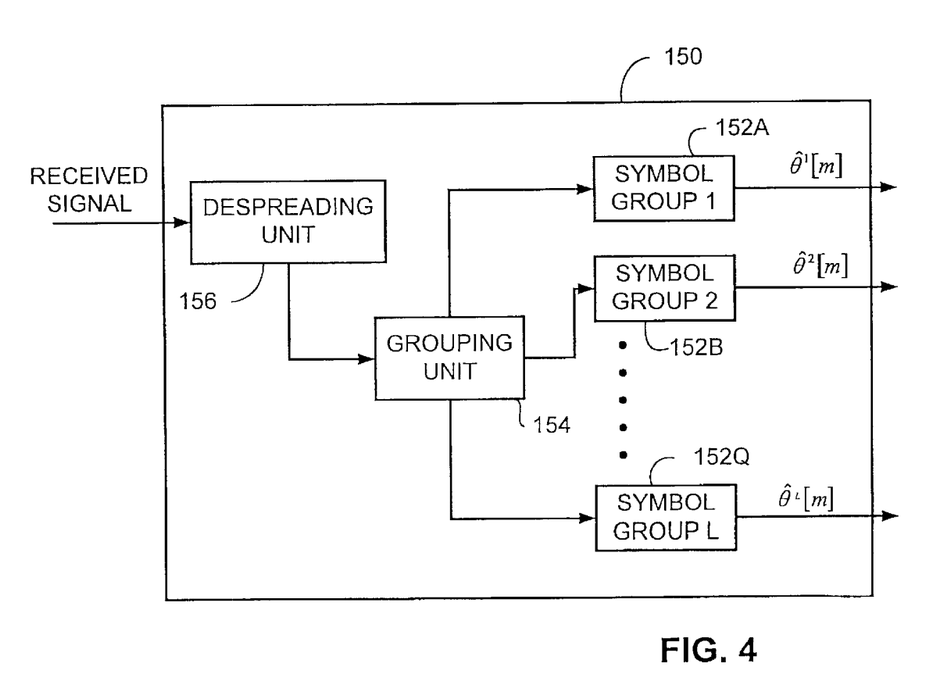
FIG. 4 is a schematic illustration of a receiver, generally referenced 100, constructed and operative in accordance with another preferred embodiment of the present invention.

Reference is now made to FIG. 4, which is a schematic illustration of a receiver, generally referenced 150, constructed and operative in accordance with preferred embodiment of the present invention.

Receiver 150 includes a plurality of the adaptive parameter-set estimation units 152A, 152B–152Q, a distributing unit 154, connected at the input of each of the adaptive parameter-set estimation units 152 and a despreading unit 156, such as a plurality of rake receivers each tuned to a specific user, connected to the distributing unit.

Each of the adaptive parameter-set estimation units 152, is adapted to process a portion of the received signal, including one or more symbols, and calculated therefrom a set of receiver parameters which minimize a pre specified cost function. The portion of the received signal includes a group of symbols, which were modulated by elements of the cyclic PN sequence, where these elements are located at predetermined locations, within the cyclic PN sequence.

The distributing unit 154 distributes the samples, to each of the adaptive parameter-set estimation units 152, according to their respective groups.

Figure 8:
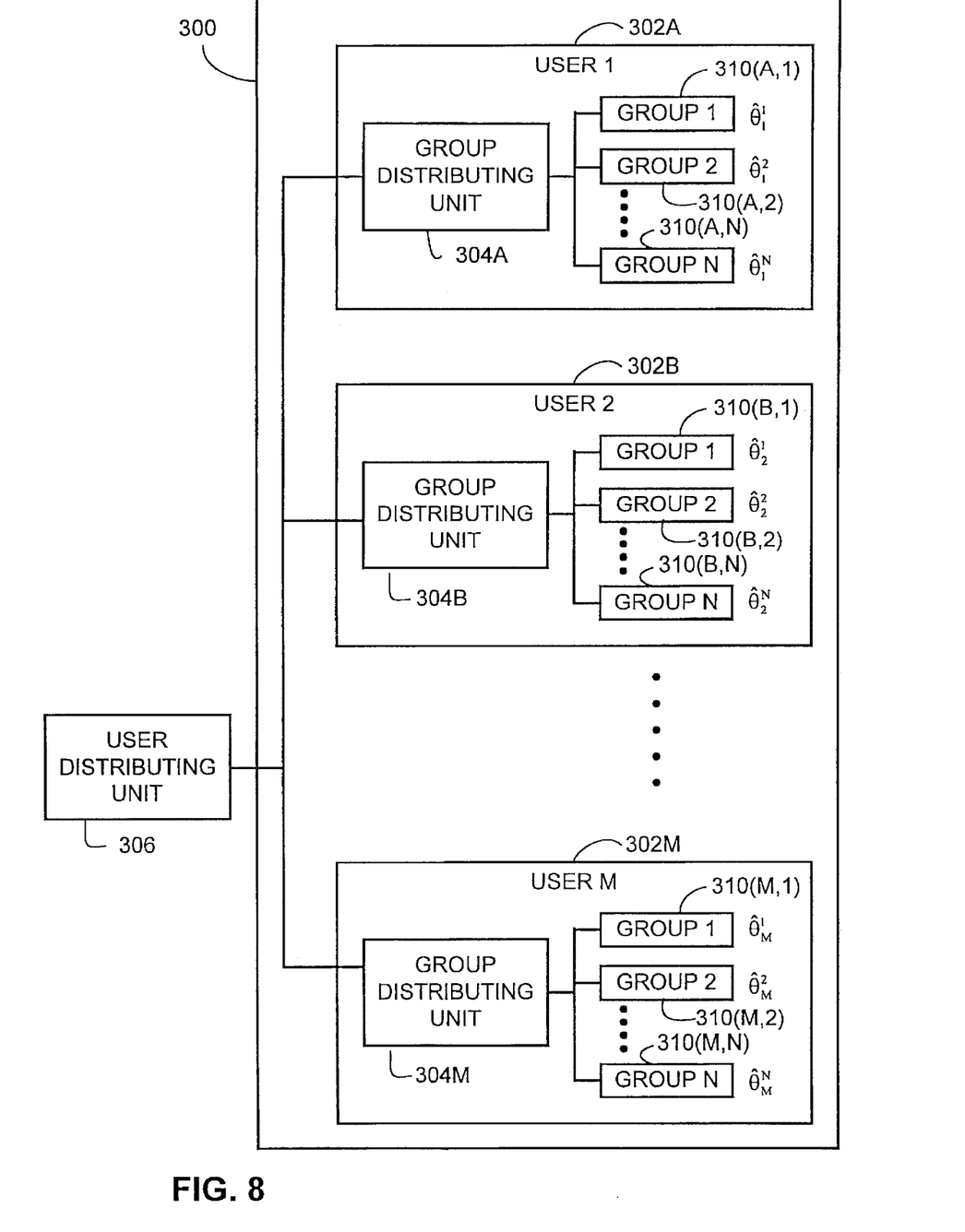
FIG. 8 is a schematic illustration of a multi-user receiver, constructed and operative in accordance with another preferred embodiment of the present invention.

Reference Is now made to FIG. 8, which is a schematic illustration of a receiver, generally referenced 300, for multi-user or multi-channel reception, constructed and operative in accordance with another preferred embodiment of the present invention.

Receiver 300 includes a user distributing unit 306 and a plurality of user processing units 302A, 302B and 302M. Each of the user processing units includes a respective group distributing unit 304 and a plurality of group processing units 310.

The user distributing unit 306 receives the incoming multi-user signal and provides each of the user processing unit 302 with the user signal respective thereof.

Each of the group distributing units further distributes its received user signal to a plurality of signal portions, each respective of a predetermined section of the cyclic sequence modulated therewith and provides portion, associated with the same section to a selected group processing unit. Accordingly, each of the group processing units 310 produces a set of receiver parameters which are directed at minimizing a predetermined cost function, associated with that particular section.

It will be appreciated by persons skilled in the art that the present invention is not limited to what has been particularly shown and described hereinabove. Rather the scope of the present invention is defined by the claims which follow.

What is claimed is:

1. A method comprising:

producing a set of parameters minimizing a cost function for a particular section of a cyclic sequence by jointly processing samples of a received signal, said signal including data modulated by at least said cyclic sequence, each of said samples modulated by said particular section of said cyclic sequence.

2. The method of claim 1, wherein said signal is a direct sequence—code division multiple access signal.

3. A method comprising:

producing a set of parameters minimizing a cost function for a particular section of a cyclic sequence by jointly processing symbols of a received signal, said signal including data modulated by at least said cyclic sequence, each of said symbols modulated by said particular section of said cyclic sequence.

4. The method of claim 3, further comprising:

demodulating samples of said signal to produce said symbols.

5. The method of claim 4, wherein said signal is a direct sequence—code division multiple access signal and demodulating said samples comprises rake demodulating said samples.

6. The method of claim 5, wherein rake demodulating said samples comprises rake demodulating said samples according to more than one user.

7. A method comprising:

producing a set of parameters minimizing a cost function for particular sections of a cyclic sequence by jointly processing a group of samples of a received signal, said signal including data modulated by at least said cyclic sequence, each of said samples modulated by one of said particular sections of said cyclic sequence.

8. The method of claim 7, wherein said signal is a direct sequence—code division multiple access signal.

9. A method comprising:

producing a set of parameters minimizing a cost function for particular sections of a cyclic sequence by jointly processing a group of symbols of a received signal, said signal including data modulated by at least said cyclic sequence, each of said symbols modulated by one of said particular sections of said cyclic sequence.

10. The method of claim 9, further comprising:

demodulating samples of said signal to produce said symbols.

11. The method of claim 10, wherein said signal is a direct sequence—code division multiple access signal and demodulating said samples comprises rake demodulating said samples.

12. The method of claim 11 wherein rake demodulating said samples comprises rake demodulating said samples according to more than one user.

13. A receiver comprising:

two or more processing units, each of said processing units able to produce a set of parameters minimizing a cost function for one or more corresponding sections of a cyclic sequence; and a distributing unit to provide samples of a received signal to said processing units, said signal including data modulated by at least said cyclic sequence, so that each of said processing units is able to process samples modulated by the sections of said cyclic sequence corresponding thereto.

14. The receiver of claim 13, wherein each of said samples includes at least one element of said data.

15. A receiver comprising:

a despreading unit to demodulate a received signal by a cyclic sequence to produce symbols, said signal including data modulated by at least said cyclic sequence;

two or more processing units, each of said processing units able to produce a set of parameters minimizing a cost function for one or more corresponding sections of said cyclic sequence; and a distributing unit to provide said symbols to said processing units so that each of said processing units is able to process symbols modulated by the sections of said cyclic sequence corresponding thereto.

16. The receiver of claim 14, wherein said despreading unit comprises rake receivers.

* * * * *